United States Patent
Nagashima et al.

[11] Patent Number: 5,742,435
[45] Date of Patent: Apr. 21, 1998

[54] VIDEO-CAMERA IMAGING-SYSTEM ZOOM LENS BARREL

[75] Inventors: Toshiro Nagashima, Tokyo; Kenichi Hamada; Koji Okajima, both of Kanagawa; Kenji Hirano, Chiba, all of Japan

[73] Assignee: Sony Corporation, Tokyo, Japan

[21] Appl. No.: 744,641

[22] Filed: Nov. 6, 1996

[30] Foreign Application Priority Data

Nov. 13, 1995 [JP] Japan ................. 7-318572

[51] Int. Cl.$^6$ ................................. G02B 15/14
[52] U.S. Cl. ................. 359/696; 359/697; 359/698; 359/704
[58] Field of Search ................. 359/696, 697, 359/698, 704

[56] References Cited

U.S. PATENT DOCUMENTS 5,543,971  8/1996  Nomura et al. .............. 359/696
5,561,561  10/1996 Fukino .......................... 359/696
5,576,894  11/1996 Kuwana et al. ............... 359/696

*Primary Examiner*—Frank G. Font
*Assistant Examiner*—Reginald A. Ratiff
*Attorney, Agent, or Firm*—Frommer Lawrence & Haug LLP; William S. Frommer

[57] ABSTRACT

Disclosed is a video-camera imaging-system lens barrel which overcomes the problem of a four-lens-group-type video-camera imaging-system lens barrel, which has a complicated structure and large size and weight due to the large number of lens groups. In a so-called two-group-type lens system, a first lens group 2 and a second lens group 3, which are in focus in an imaging plane (CCD 4) for each zoom magnification at fixed subject distances $\alpha m$ and $\beta m$, are controlled such that they move along zoom tracking curves $l_1, l_2, l_3$ and $l_4$ which represent the paths of movement of the respective positions of the first lens group and the second lens group.

2 Claims, 2 Drawing Sheets

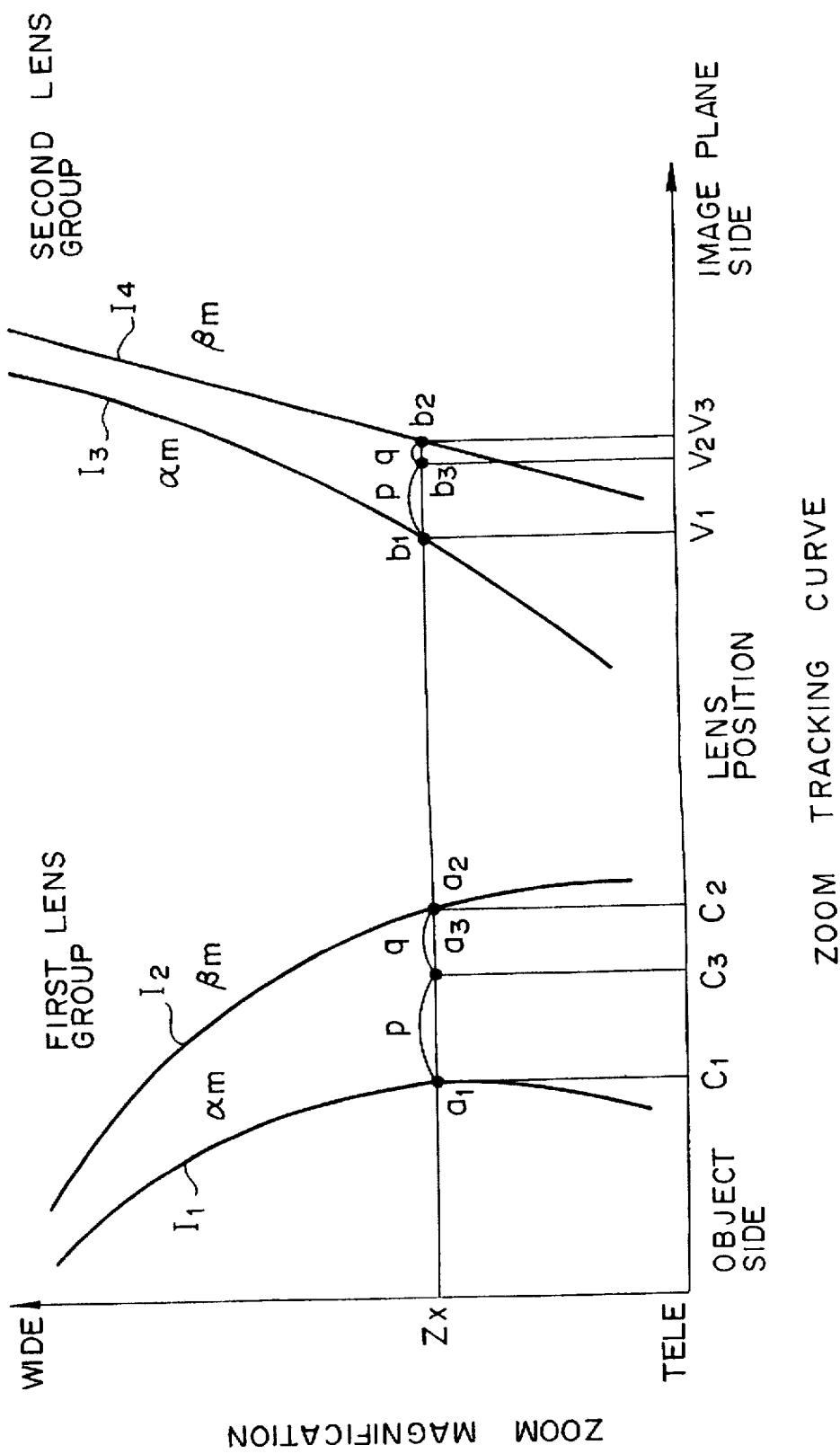

VIDEO-CAMERA IMAGING-SYSTEM ZOOM LENS BARREL

BACKGROUND OF THE INVENTION

1. Field of the Invention

The present invention relates to a technique for focusing during zooming in a two-group lens system in a video-camera imaging-system zoom lens barrel.

2. Description of the Related Art

Conventionally, a so-called four-group lens system has been generally used in a video-camera imaging-system zoom lens barrel, which lens system includes two stationary lens groups and two movable lens groups.

One of the movable lens groups performs scaling, and the other movable lens group performs correction on scaling and adjustment in focusing.

When performing zooming, one movable lens group is moved and, at the same time, the other movable lens group is moved by a predetermined amount which is determined from the viewpoint of optical designing.

When performing focusing, the other movable lens is moved.

Apart from this, as an imaging-system zoom lens barrel, a so-called two-group lens system is known for use in a still camera, which lens system is composed of a first lens group of a negative refractive power and a second lens group of a positive refractive power.

In such a two-group lens system, the first lens group and the second lens group are operationally coupled by a cam cylinder. When a predetermined magnification is attained, the movement of the lens groups is stopped and, in this condition, the first lens group is moved to perform focusing.

Of the above-described conventional lens barrels, the four-group imaging zoom lens barrel for video cameras has a problem in that it has a complicated structure due to the large number of lens groups, which leads to a rather large size and weight.

On the other hand, in the above-described two-group lens system for still cameras, the two lens groups are operationally coupled by a cam cylinder, so that it is impossible to achieve an improvement in terms of accuracy in positional relationship of the two lens groups. Thus, an in-focus state is rarely attained during zooming. In a still camera, focusing adjustment has only to be performed when a predetermined magnification has been attained, so that there is no need for an in-focus state to be achieved during zooming. Thus, no consideration has been made with a view toward achieving an in-focus state during zooming.

Further, the focusing after the predetermined magnification has been attained is performed by moving the first lens group, so that the variation in angle of view is rather large, resulting in a rather ugly picture.

SUMMARY OF THE INVENTION

It is an object of the present invention to provide a video-camera imaging-system zoom lens barrel which adopts a lens system consisting of two groups and in which the generation of an out-of-focus state during zooming is restrained.

In accordance with the present invention, in a two-group lens system, zoom tracking curves which represent the paths of movement of the respective positions of the first and second lens groups, which are in focus in an imaging plane at each zoom magnification with respect to fixed subject distances, are calculated beforehand, and the first and second lens groups are controlled to move along these curves.

Thus, in accordance with the present invention, it is possible to adopt a two-group lens system for the zoom lens of a video camera, thereby achieving a simplified construction and a reduction in size and weight. Further, since the first and second lens groups move along the respective zoom tracking curves, an in-focus state is always maintained even during zooming, so that the cameraman does not experience an unpleasant feeling due to an out-of-focus state during zooming.

BRIEF DESCRIPTION OF THE DRAWINGS

FIG. 2 is a graph showing zoom tracking curves in the present invention.

DESCRIPTION OF THE PREFERRED EMBODIMENT

Figure 1:
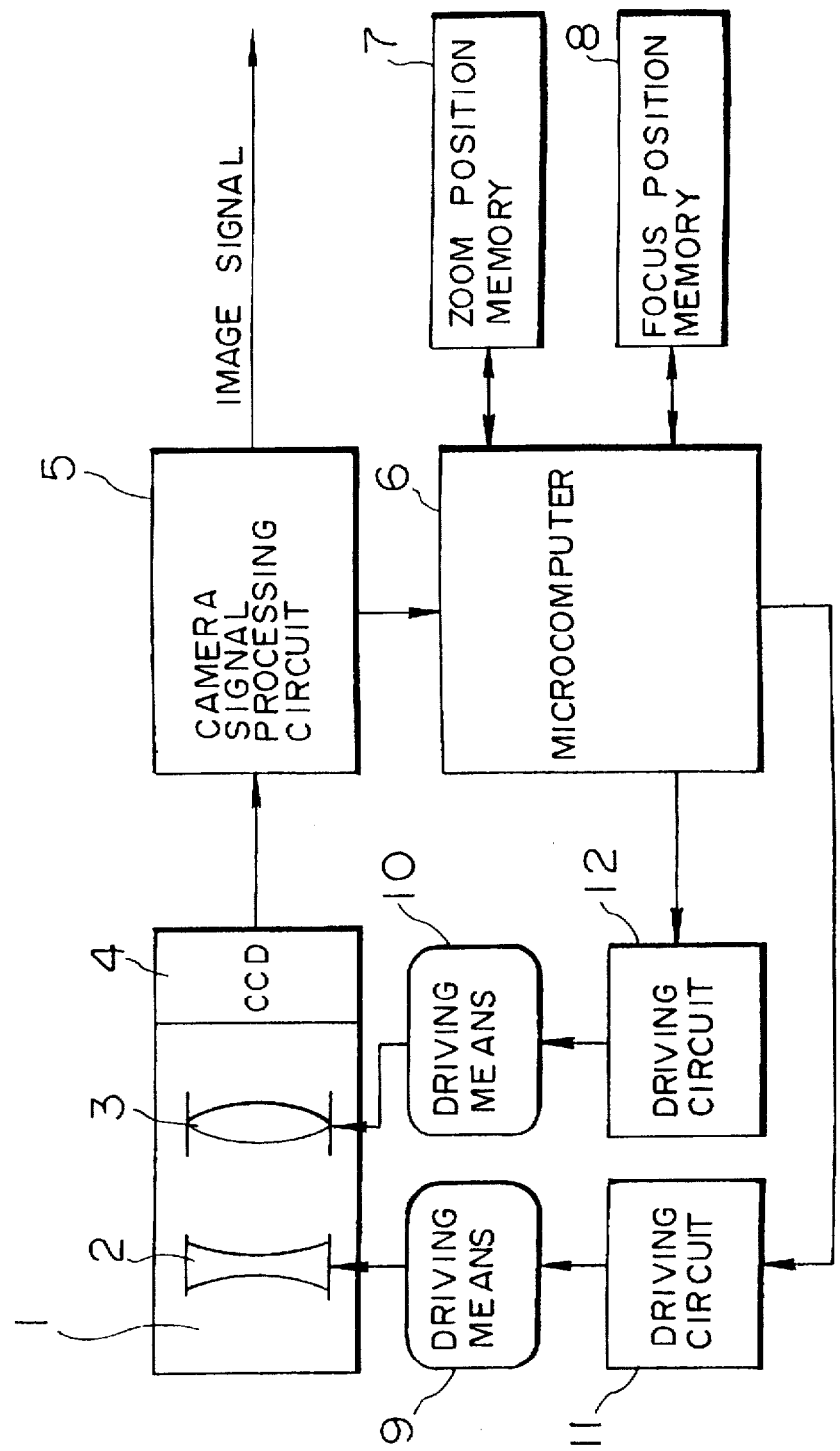
FIG. 1 is a circuit diagram showing an embodiment of a video-camera imaging-system zoom lens barrel according to the present invention.

An embodiment of the video-camera imaging-system zoom lens barrel of the present invention will now be described in detail with reference to the accompanying drawings. Referring to FIG. 1, a lens barrel 1 is equipped with a first lens group 2 supported so as to be movable along the optical-axis dimension, a second lens group 3 arranged on the output side of the first lens group 2 such that the optical axis of the two lens group are aligned with each other and that the second lens group is movable along the optical-axis dimension, and a solid-state image sensing device (CCD) 4 which is arranged on the output side of the second lens group 3. The first lens group 2 has a negative refractive power, and the second lens group 3 has a positive refractive power.

An image input to the CCD 4 is converted to an electric signal and then converted to an image signal by a camera signal processing circuit 5 before it is output to an image signal processing circuit (not shown) and to a microcomputer 6.

The lens group 2 and the second lens group 3 are separately connected to driving means 9 and 10, respectively. These driving means 9 and 10 are separately controlled by driving circuits 11 and 12. These driving circuits 11 and 12 receive a control signal from the microcomputer 6 to operate the driving means 9 and 10.

Connected to the microcomputer 6 are a zoom position memory 7 and a focus position memory 8.

The zoom position memory 7 stores data regarding zoom magnification by a signal from a zoom operating button (not shown). The focus position memory 8 stores data regarding subject distance by focusing operation.

The microcomputer 6 has a memory in which zoom tracking curves are stored beforehand.

The zoom tracking curves are curves representing the respective paths of movement of the positions of the two lens groups 2 and 3, which are in focus in the imaging plane with respect to each zoom magnification at fixed subject distances. These curves are obtained when designing the lens system.

For example, in FIG. 2, when the subject distance is ∞m, the path of movement of the first lens group 2 is represented by zoom tracking curve $l_1$ and the path of movement of the second lens group 3 is represented by zoom tracking curve $l_3$. When the zoom magnification is Zx, the first lens group 2 is at position $C_1$ (point $a_1$), and the second lens group 3 is at position $V_1$ (point $b_1$). When the subject distance is $\beta m$, the path of movement of the first lens group 2 is represented by zoom tracking curve $l_2$ and the path of movement of the second lens group 3 is represented by zoom tracking curve $l_4$. When the zoom magnification is Zx, the first lens group 2 is at position $C_2$ (point $a_2$), and the second lens group 3 is at position $V_2$ (point $b_2$). FIG. 2 shows only two cases in which the subject distance is $\alpha m$ and $\beta m$, respectively. At least two such zoom tracking curves at fixed subject distances are calculated beforehand for each predetermined subject distance when designing the lens system.

The microcomputer 6 controls such that the first lens group 2 and the second lens group 3 move along the respective zoom tracking curves on the basis of the zoom magnification data stored in the zoom position memory 7 and the subject distance data stored in the focus position memory 8, respectively.

Due to this arrangement, the first lens group 2 and the second lens group 3, which move along the respective zoom tracking curves, are constantly maintained in the in-focus state when the subject distance does not vary, and no out-of-focus state is generated even during zooming.

Regarding a subject distance of which a corresponding zoom tracking curve is not stored beforehand, the respective lens positions of the first lens group 2 and the second lens group at the zoom magnification is calculated from the difference between this subject distance and the subject distance whose zoom tracking curve is stored beforehand.

That is, for example, at a constant zoom magnification (Zx), when the subject is at a position which is between the subject distances $\alpha m$ and $\beta m$ and which internally divides the difference to p:q, the above-mentioned microcomputer 6 calculates, regarding the first lens group 2, a position $C_3$ (point $a_3$) which internally divides the distance between the point $a_1$ of the zoom tracking curve $l_1$ (the lens position $C_1$) and the point $a_2$ of the zoom tracking curve $l_2$ (the lens position $C_2$) to p:q and, regarding the second lens group 3, a position $V_3$ (point $b_3$) which internally divides the distance between the point $b_1$ of the zoom tracking curve $l_3$ (the lens position $V_1$) and the point $b_2$ of the zoom tracking curve $l_4$ (the lens position $V_2$) to p:q.

The high-frequency component of the image signal, which is input to the microcomputer 6 by the camera signal processing circuit 5, is extracted, and a control signal for focusing adjustment to effect focusing according to the proportion of the high-frequency component, the control signal being input to the driving circuits 11 and 12. Such focusing is not necessary when the subject distance is fixed since the in-focus state can be maintained by moving the two lens groups 2 and 3 along the zoom tracking curves as described above. However, when actually photographing, it can happen that the subject distance varies. In such a case, the above focusing control is effected.

The configuration and structure of each part of the above-described embodiment are only given by way of example for the purpose of presenting an example of how the invention is to be carried out, and they should not be construed restrictively in terms of the technical scope of the invention.

What is claimed is:

1. A video-camera imaging-system lens barrel comprising:

a first lens group supported so as to be movable along the dimension of its optical axis;

a second lens group whose optical axis coincides with that of the first lens group and which is supported so as to be movable along the dimension of the optical axis;

driving means for individually moving the first lens group and the second lens group; and a microcomputer for outputting a control signal to said driving means, wherein said microcomputer includes a memory which stores beforehand zoom tracking curves respectively representing the paths of movement of the respective positions of the first lens group and the second lens group, which are in focus in an imaging plane with respect to each zoom magnification at fixed subject distances, with respect to at least two different subject distances, said driving means being controlled such that the first lens group and the second lens group are respectively moved along the corresponding zoom tracking curves.

2. A video-camera imaging-system lens barrel according to claim 1, wherein the first lens group has a negative refractive power and wherein the second lens group has a positive refractive power.

* * * * *